US008303392B2

(12) United States Patent
Stromer

(10) Patent No.: US 8,303,392 B2
(45) Date of Patent: Nov. 6, 2012

(54) AUXILIARY POT SHOT POKER VIDEO POKER GAME AND POKER TABLE SURFACE

(75) Inventor: Daniel Stromer, Glenvil, NE (US)

(73) Assignee: Black Chip Entertainment LLC, Glenvil, NE (US)

( * ) Notice: Subject to any disclaimer, the term of this patent is extended or adjusted under 35 U.S.C. 154(b) by 15 days.

(21) Appl. No.: 13/044,898

(22) Filed: Mar. 10, 2011

(65) Prior Publication Data

US 2012/0231863 A1 Sep. 13, 2012

(51) Int. Cl.
*G06F 17/00* (2006.01)

(52) U.S. Cl. .......................................................... 463/13

(58) Field of Classification Search ............... 463/13–25
See application file for complete search history.

(56) References Cited

U.S. PATENT DOCUMENTS

| | | | | |
|---|---|---|---|---|
| 5,294,120 | A | 3/1994 | Schultz | |
| 5,769,422 | A | 6/1998 | Stromer | |
| 5,868,618 | A | 2/1999 | Netley et al. | |
| 5,868,619 | A * | 2/1999 | Wood et al. | 463/13 |
| 6,270,405 | B1 * | 8/2001 | Ferguson | 463/13 |
| 7,056,207 | B2 * | 6/2006 | Walker et al. | 463/13 |
| 7,404,762 | B2 | 7/2008 | Moody | |
| 7,749,061 | B2 * | 7/2010 | Walker et al. | 463/13 |
| 7,762,879 | B2 | 7/2010 | Cranford | |
| 2006/0030395 | A1 * | 2/2006 | Thomas et al. | 463/17 |
| 2009/0029757 | A1 * | 1/2009 | Englman et al. | 463/13 |
| 2009/0264190 | A1 * | 10/2009 | Davis et al. | 463/26 |
| 2011/0053671 | A1 * | 3/2011 | Aoki et al. | 463/16 |
| 2012/0021813 | A1 * | 1/2012 | Aoki et al. | 463/13 |

* cited by examiner

*Primary Examiner* — Ronald Laneau
(74) *Attorney, Agent, or Firm* — Cameron LLP

(57) ABSTRACT

An auxiliary pot shot video poker game and a poker table surface comprise a variety of unique and independent betting positions such as No Pair. A player betting on No Pair may place their bet or wager that the end outcome of poker game play will be that their hand will represent no pair, a poor outcome. Other positions of the auxiliary game may comprise one pair of 2's through 10's, one pair of Jack's through Aces, two pair, three of a kind, a straight, a full house and so on with generally increasing pay-offs as the likelihood of receiving the predicted outcome poker hand decreases. However, because these bets are independent the payoffs may be much larger than a pay-off for a standard video poker or poker table game. As a poker game continues and cards are dealt, a player of the auxiliary game may receive compensation for bets on predicted outcomes with automatically calculated pay-offs depending on the wagers places. In a five card draw game, the cards the player receives after selecting cards to be held determines the outcome of the hand and the associated pay off. The auxiliary game may be adapted for play with many types of poker games including but not limited to five card, six card and seven card stud, five card draw and wild card play.

20 Claims, 9 Drawing Sheets

| HAND (210) | PAYOFF (220) | | PROBABILITY (225) | RETURN (230) |
|---|---|---|---|---|
| ROYAL FLUSH | 1000 | 553693344 | 0.000028 | 0.027777 |
| STRAIGHT FLUSH | 50 | 2181883836 | 0.000109 | 0.005473 |
| 4 OF A KIND | 20 | 4.6927E+10 | 0.002354 | 0.047084 |
| FULL HOUSE | 7 | 2.2889E+11 | 0.011483 | 0.080379 |
| FLUSH | 5 | 2.2023E+11 | 0.011049 | 0.055243 |
| STRAIGHT | 4 | 2.2613E+11 | 0.011344 | 0.045378 |
| 3 OF A KIND | 3 | 1.4777E+12 | 0.074133 | 0.222398 |
| TWO PAIR | 2 | 2.569E+12 | 0.128881 | 0.257761 |
| JACKS OR BETTER | 1 | 4.2524E+12 | 0.213334 | 0.213334 |
| NOTHING | 0 | 1.0909E+13 | 0.547286 | 0 |
| TOTAL | | 1.9933E+13 | 1 | 0.954828 |

FIG. 2A

| | TRUE ODDS (240) | PAY OFFS (220) | RTP (230) |
|---|---|---|---|
| NO PAIR | 1.82719821 | 1.5 | 0.820929 |
| PAIR OF JACKS-ACES | 4.68748535 | 4.5 | 0.960003 |
| TWO PAIR | 7.7590956 | 7.5 | 0.9666075 |
| 3 OF A KIND | 13.4892693 | 13 | 0.963729 |
| STRAIGHT | 88.1523272 | 80 | 0.90752 |
| FLUSH | 90.5059281 | 80 | 0.88392 |
| FULL HOUSE | 87.0852565 | 80 | 0.91864 |
| 4 OF A KIND | 424.808836 | 400 | 0.9416 |
| STRAIGHT FLUSH | 9174.31193 | 8750 | 0.95375 |
| ROYAL FLUSH | 35714.2857 | 30000 | 0.84 |

FIG. 2B

| | | | | |
|---|---|---|---|---|
| ROYAL STRAIGHT FLUSH | $800 | 0.00002476 | 0.01980661 | 0.01980661 |
| OTHER STRAIGHT FLUSH | 50 | 0.00010931 | 0.00546545 | 0.02527207 |
| FOUR OF A KIND | 25 | 0.00236255 | 0.05906364 | 0.08433571 |
| FULL HOUSE | 9 | 0.01151221 | 0.10360987 | 0.18794558 |
| FLUSH | 6 | 0.01101451 | 0.06608707 | 0.25403264 |
| STRAIGHT | 4 | 0.01122937 | 0.04491747 | 0.29895011 |
| THREE OF A KIND | 3 | 0.07444870 | 0.22334610 | 0.52229621 |
| TWO PAIRS | 2 | 0.12927890 | 0.25855780 | 0.78085401 |
| PAIR: JACKS OR BETTER | 1 | 0.21458503 | 0.21458503 | 0.99543904 |
| LOWER PAIR OR NO PAIRS | 0 | 0.54543467 | 0.00000000 | 0.99543904 |

FIG. 4

POT SHOT POKER

AUXILIARY POT SHOT POKER VIDEO POKER GAME AND POKER TABLE SURFACE

BACKGROUND

1. Technical Field

The technical field relates generally to the field of video poker-type electronic games and a poker table surface for playing an auxiliary game to a poker card table or video poker game and, more particularly, to a game betting position whereby a poker player may place a bet related to the quality of a poker hand that the player will be dealt such as, for example, no pair, various pairs (for example, a pair of jacks through aces), two pair, three of a kind and so on, prior to a player of the auxiliary game receiving or a video poker apparatus displaying the player's poker hand in either a video poker game or a poker card table game.

2. Background

Auxiliary games are known for playing a known card game such as blackjack. Cranford, U.S. Pat. No. 7,762,879 describes an electronic blackjack game apparatus and a blackjack game called "Bet the House Blackjack." An auxiliary game permits a player to place a bet on what the dealer's hand will be, as well as to place bets on a hand dealt by the dealer (or issued by the gaming apparatus) to the player. In particular, the player may bet that the dealer, for example, will deal himself a seven card hand which would pay, for example, 6500 to 1 odds and thus reap for the player a $6500 pay-off for a one dollar bet. If the dealer deals himself an all red hand, the pay-off to a player playing the auxiliary "Bet the House Blackjack" game would be about 5 to 1 or the player would receive $5.00 for a one dollar bet.

The present applicant has been issued U.S. Pat. No. 5,769,422, which also describes a variation on a blackjack card game and apparatus. In this variation, the banker and the player are each dealt one card, and the player makes an initial wager limited at least by the amount placed in the bank by the banker. Once a second card is dealt to each, the player may stand on their hand or take another card. The banker may then accept cards until a winner is determined by conventional blackjack rules.

Schultz in U.S. Pat. No. 5,294,120 describes an improved video poker variation regarding draw poker where the player makes an initial commitment as to the number of draw cards. Payoff tables may vary dependent on the number of draw cards selected.

Netley et al. in U.S. Pat. No. 5,868,618 describes a video poker game method and apparatus which permits a player to wager an amount of winnings from a first game of poker on a second game of poker, thereby, increasing the possible payout from playing both games (or tiers) of a video poker game, if the player wins both games in sequence.

Yoseloff, U.S. Pat. No. 6,334,613 describes a poker game that may be played as either a video poker game or a conventional poker card game whereby a player dealt one poker hand may play the poker hand in two ways, for example, as a conventional draw game with no wild cards and a less conventional game with wild cards such as deuces wild. The player may be required to pick one way of playing over the other.

Moody, U.S. Pat. No. 7,404,762 describes an electronic video poker game allowing a player to play more than one hand at once where the hands are the same. Moreover, a player may play each hand differently and receive a pay-off based on a wager on each hand (if the resulting card hand is deserving of a pay-off according to standard odds).

While there are many known variations of poker table card games and of video poker games and means for adapting known table card games such that they may be played on video electronic gaming apparatus, there remains a need in the art to further improve on variations of known poker table card games and video poker games. It is also desirable to provide a player with greater enjoyment and opportunities as well as greater potential profit for the video poker apparatus owner of the "house" in a poker card game.

SUMMARY OF THE EMBODIMENTS

Embodiments of a known poker card table game may be enhanced by the play of an auxiliary game to the known poker card table game. Moreover, such an auxiliary game may be implemented as an auxiliary game to a known video poker gaming apparatus. The auxiliary game or set of such games will be referred to herein as Pot Shot Poker. In particular, in embodiments either of a poker card game table surface or of an electronic video poker game, additional betting positions, buttons, keys or virtual keys are provided for placing or selecting an amount of a wager or bet in Pot Shot Poker. A wager position or set of positions, referred to herein as The Flop (for example, a five card wager), may display a player's prediction as to the results of a first set of cards dealt of a poker hand. An intermediate poker hand (as in draw poker) or a final poker hand, referred to herein as The River (for example, a sixth card wager) will be displayed once all cards have been dealt and any discards collected as a final dealt poker hand. For example, the player may place a wager via their position at a table, a button, key or virtual key of a video poker machine before receiving cards of a five card poker hand (The Flop) or after being dealt at least one final card (for example, a sixth card) as in The River.

According to one embodiment, the video poker or poker card table game may, for example, be five card stud. Prior to receiving a five card stud hand in either conventional video card game table play or video poker game play, the player may place a bet or wager in the Flop area of the betting section as to what the player predicts the poker hand will comprise that will be dealt by the dealer. For example, the player may predict that he or she will receive No Pairs and may, for example, bet one dollar on receiving a no better hand than No Pairs. Having no pairs in a five card poker hand or, after six cards, or especially, a seven card stud hand is a low quality hand. An exemplary pay-off for No Pairs may be 1.75 to one. In Pot Shot Poker, even if the player does not win the traditional wager of a video poker or a poker table game hand, the player may "win" the auxiliary Pot Shot Poker game and receive, for example, $1.75 for every dollar bet on No Pairs in the auxiliary game and lose the standard poker game.

In another embodiment, the opportunity would be available for both the dealer and the player to receive cards and wager accordingly. In addition, the player could have the opportunity to place wagers as each card appears or is dealt, for example after the second card, third card, fourth and so on to the at least one River card. The appropriate payoff could then be determined by a processor as the odds change with the introduction of each new card.

In another embodiment, further betting keys or positions may comprise unique wagers of No Pair paying 1.75 to one, a pair of between 2 deuces and 2 10's paying 3 to 1. a pair between Jacks and Aces (paying, for example, at 4.5 to one), 2 pair paying at 7.5 to one, 3 of a kind at 13 to 1, a Straight at 20 to 1, a Flush at 30 to 1, and Full House at 35 to 1, 4 of a Kind at 100 to 1, a Straight Flush at 1000 to 1, and 5 of a Kind (using jokers) at 10,000 to one. A Royal Flush may pay, for example, 30,000 to one in a five card stud game if a bet is placed on Royal Flush before a five card game begins in the Pot Shot Poker auxiliary game of this embodiment. This wager or a similar wager for a straight flush may be a position located proximate to the dealer.

A standard Video Poker single wager for a standard video poker game is all inclusive to the different types of outcomes and results in a proportionate payoff made to a specific group of hands that are dealt based on a pay-out table displayed on the video poker machine. Also, there are various forms of Video Poker that may involve wild cards, extra bonuses or other alternatives. The pay-off, depending on the form of video poker, may change. In Pot Shot Poker, the pay off will likewise be predetermined depending on the unique wagers such as No Pair and the rest of the wagers being placed that are independent of each other before cards are dealt and after there are discards and fresh cards dealt.

Accordingly, in one embodiment of a Pot Shot Poker auxiliary video poker game or card table game, the dealer or the player may be provided with an electronic communications interface to a centralized casino or machine operated under the laws of a given state. The poker table surface as seen by a player may display different pay-offs on, for example, a mobile device, may be based on a plurality of different types of poker games selectable for play, including but not limited to five card stud. Moreover, in one embodiment of a video poker Pot Shot Poker auxiliary game, a player may place wagers that vary, for example, in five card draw, after the initial hand is displayed to a player of video poker as each card is dealt or depending on the version after the first five cards are dealt, a decision is made to play or hold certain cards, and the outcome becomes more determined as will be described herein. In other words, the player may bet on the predicted final outcome depending on the first five cards in sequence that he has been dealt in a Pot Shot Poker auxiliary game to the standard poker card game and/or the final poker hand after holds and discards and new cards dealt.

An interesting outcome of such an auxiliary game to a poker game such as Pot Shot Poker is that a player may play against themselves. For example, a player may place a wager that their hand will be No Pair, i.e., a poor hand. Yet, the player may actually draw, for example, three of a kind, and so be very pleased with their regular bet but lose their auxiliary Pot Shot Poker No Pair bet. The player proceeds to receive a larger pay-off based on the three of kind and lose their Pot Shot Poker No Pair bet as a hedge against the larger winnings of the three of a kind hand.

Although the game of Video Poker is accepted across the United States and many foreign countries, it would be desirable to provide certain improvements. For example, it would be desirable to provide modifications to the game to make the game more exciting and more interesting. In addition, it would be more desirable to allow players to make different wagers in which they would have the opportunity to win larger amounts of money from a single wager. It is expected that one of ordinary skill may adapt the principles of embodiments of an auxiliary game disclosed herein, referred to generally herein as Pot Shot Poker, to many different forms of poker card games including low hand wins, seven card stud, five card draw, wild cards and many, if not all, forms of poker card table and video poker game play.

Further embodiments to those described above and below provide both a method and apparatus for playing Video Poker and poker card table games that provide a unique opportunity to not only play standard Video Poker/card table poker but make a new and unique wager not available on any other form of Video Poker or card table poker. In this way, the player has an opportunity to place a single or multiple Pot Shot Poker wagers on the player's predicted outcome of the poker games which are exclusive and correspond to a payoff table only on that wager and dependent on that variety of poker games being played and stage of play of the poker game.

An additional embodiment may allow, for example, in five card stud, the player placing a wager based on receiving three cards of their five card hand, recognizing that the pay-off will be reduced by the known three cards with only two cards remaining to be dealt. By utilizing this embodiment, a data processor may automatically and immediately recalculate odds and display immediate pay-offs depending on the game and stage of play of the game.

In an exemplary method, the invention allows for the player to play a regular Video Poker game but, in addition, allows for the Pot Shot Poker auxiliary wager to be placed as well. These auxiliary wagers may be placed via a special button/key/virtual key panel located on the face of the machine (or on an associated display screen), a display of an intelligent wireless terminal or personal computer or other apparatus or a special betting section on a poker game table surface. In one embodiment of a poker table game or a video poker Pot Shot Poker auxiliary game, a total of one or more, such as eight, nine or more buttons or positions may be available to make the additional unique wagers to a standard poker table game or video poker game. An exemplary regular game of video poker or table poker may permit an auxiliary Pot Shot Poker wager of No Pair, a Pair of 2's-10's, a Pair of Jacks-Aces, 2 pair, 3 of a Kind, Straights, Flushes, Full Houses, 4 of Kind, Straight Flushes and Royal Flushes 5 of a Kind (including, for example, joker wild cards), (a total of ten positions) to be paid according to a pay off table unique to each individual betting position prior to the start of play. The present auxiliary game, referred to herein as Pot Shot Poker, may have a payoff for each wager and the wager may be placed on more than one position in The Flop or in The River, prior to cards of a poker hand being dealt.

The following table provides exemplary wagers and payoffs before a player hand is dealt:

| Wager | Payoff (Example could be variable) |
|---|---|
| No pair | 1 to 1 |
| Pair, 2's-10's | 2 to 1 |
| Pair, jacks-Aces | 4 to 1 |
| 2 Pair | 7 to 1 |
| 3 of Kind | 13 to 1 |
| Straight | 80 to 1 |
| Flush | 80 to 1 |
| Full House | 80 to 1 |
| 4 of Kind | 400 to 1 |
| Straight Flush and Royal Flush | 25000 to 1 |
| Five of Kind (Jokers wild) | 10,000 to 1 |

By introducing this unique pre-hand wager as an opportunity to a player, the player is provided with an exciting new alternative to a game of poker that is not currently available. For example, in addition, the player is provided with some interesting new strategies of hedging their initial wager with the new optional wagering positions of the auxiliary Pot Shot Poker game. By incorporating these new aspects to an embodiment of such an auxiliary poker game as Pot Shot Poker, a video poker or poker table surface product may be provided that is currently not available in the market but may provide enhanced enjoyment to the player and additional revenues to a machine owner or casino manager.

Further features of embodiments of a poker auxiliary game will become more clear from a brief and detailed description of the drawings which follows wherein like reference numerals are intended to refer to similar elements throughout the drawings.

BRIEF DESCRIPTION OF THE DRAWINGS

FIG. 2A provides a table of hand, a payoff, a probability and a return for a wager by a player of Pot Shot Poker; FIG. 2B is a conversion table showing examples of true odds, pay offs and return to player (RTP) for each of the Pot Shot Poker wager positions: No Pair, Pair of Jacks through Aces, Two Pair, Three of a Kind, Straight, Flush, Full House, Four of a Kind, Straight Flush and Royal Flush.

FIG. 4 provides a Table showing exemplary true odds and offered pay-offs to players in view of those true odds; for example, while a Royal Straight Flush may pay $800 for every wager of $1, the pay-off shown in FIG. 2A is 1000, demonstrating that pay-off may vary.

DETAILED DESCRIPTION

Figure 1:
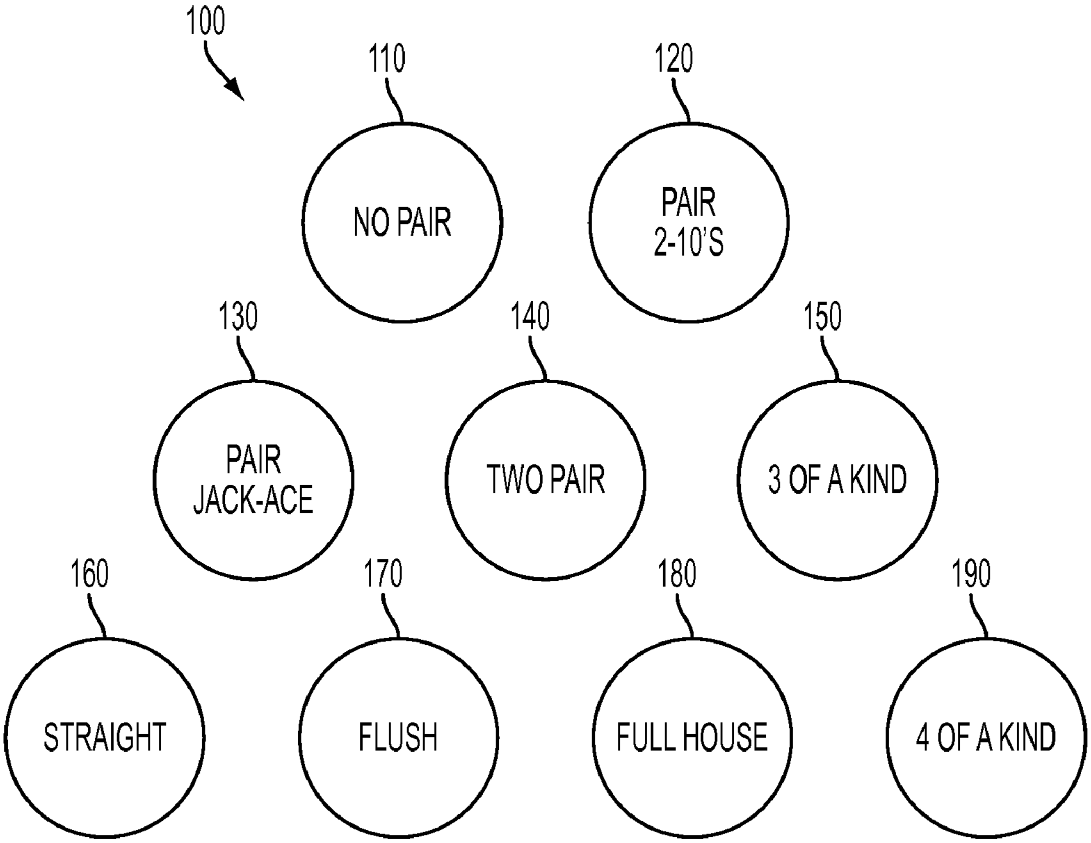
FIG. 1 is an exemplary poker table position referred to herein as The Flop, which may likewise be a display, collection of buttons, keys or virtual key panel of a Pot Shot Poker auxiliary game to a known video poker game for receiving wagers of a Pot Shot Poker auxiliary game, for example, based on a five card hand.

Referring now to FIGS. 1-9, embodiments of Pot Shot Poker will be described wherein like reference numerals refer to like elements and the first number of the element indicates the figure number in which the element first appears. For example, No Pair position 110 of the Flop 100 appears first in FIG. 1 and also The Flop 100 appears in FIG. 5. Knowledge of normal poker card play will be assumed and the following discussion will concentrate on aspects of Pot Shot Poker, an auxiliary game to a standard poker game.

Referring first to FIG. 1, there is shown an exemplary Pot Shot Poker auxiliary game layout area for a player of a poker table game, in particular, The Flop area 100. The Flop area 100 may comprise a poker table betting position for a player or, in a video poker apparatus, a key or virtual key or button or a touch activated screen array 100 that comprises a plurality of features, especially a label such as No Pair 110 related to a player predicted outcome, prior to deal of one or more cards of one or more poker hands. An arbitrary plurality of betting positions may be provided in an auxiliary game with pay offs selected by the "house." In the example of FIG. 1, The Flop 100 contains nine betting positions for wagers on, for example, the first five cards dealt. The nine exemplary betting positions of the Flop 100 may comprise, for example, No Pair 110, a Pair comprising 2's through 10's 120, a Pair of Jacks through a pair of Aces 130, Two Pair 140, 3 of a Kind 150, Straight 160, Flush 170, Full House 180 and 4 of a Kind 190. Before a hand is dealt in Pot Shot Poker, The Flop 100 may receive a first plurality of bets on, for example, a five card hand to be dealt. The No Pair position 110 is an example of where a player may place a wager expecting to receive a poor five card hand. No Pair 110 is thus a means for a player to hedge their bets or wager against a hand dealt them being a better quality hand than having no pair.

No straight flush or royal flush position is shown in The Flop Area 100 of FIG. 1. These positions (which may include a five of a kind position in wild card play) may be omitted from this area and more securely located proximate a dealer. A straight flush or royal flush wager may have a very high pay-off and so reserved for a special area of table play so that the dealer may be better able to control the area of play set aside for these bets. For example, referring briefly to FIG. 5 which shows an entire table layout, a straight flush betting position 510-1 is shown proximate to card 3 of a hand dealt by a dealer for a first wager placed before five cards are dealt (associated with all wagers in The Flop Area 100). A second betting area 510-2 is shown proximate the sixth card to be dealt in an example game to be described with reference to FIG. 7, (the sixth card position being associated with The River area 300 of FIG. 3 yet to be explained).

Figure 6:
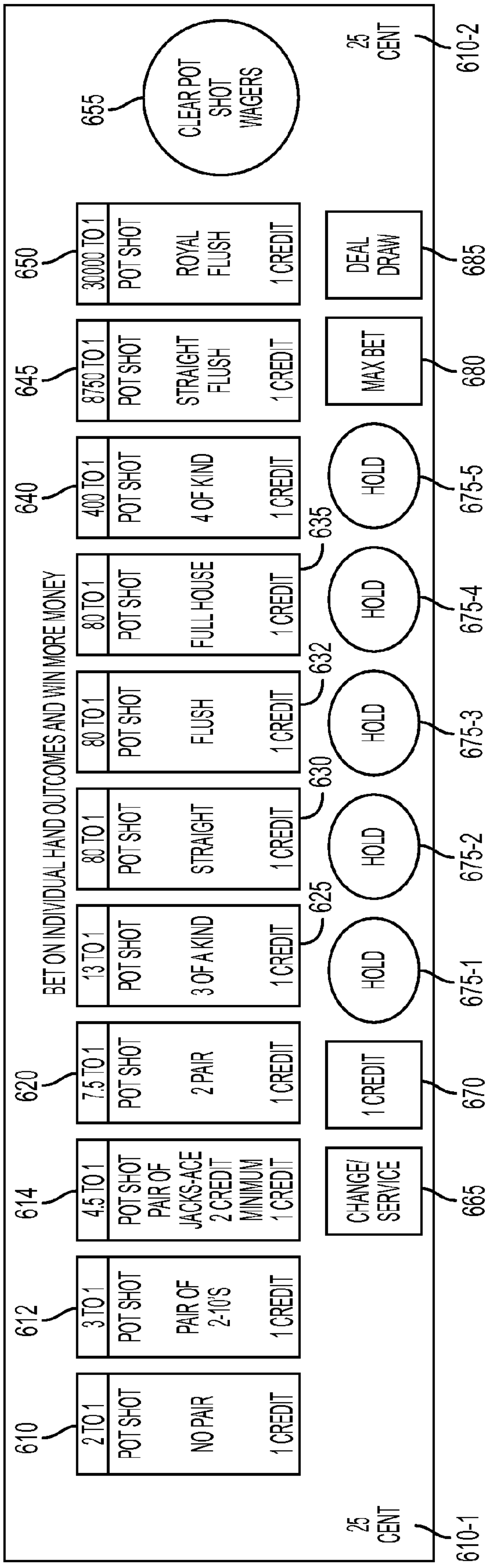
FIG. 6 is an exemplary arrangement for an auxiliary Pot Shot Poker game played on a video poker machine which may be a form of slot machine or played remotely via a specially programmed device having a configuration shown in FIG. 8; there are shown, by way of example, eleven betting positions between No Pair and a Royal Flush.

Referring briefly to FIG. 6, a label such as Pot Shot Poker may identify an auxiliary video poker game portion of a video poker apparatus to distinguish the Pot Shot Poker portion from other features of video poker game apparatus. Money may be deposited or accepted, for example, as any acceptable currency. Currency, if permitted by the local jurisdiction, may be entered by any means acceptable such as electronic funds transfer (EFT), credit card, debit card or other financial transfer to purchase credits for playing the Pot Shot Poker apparatus.

Figure 5:
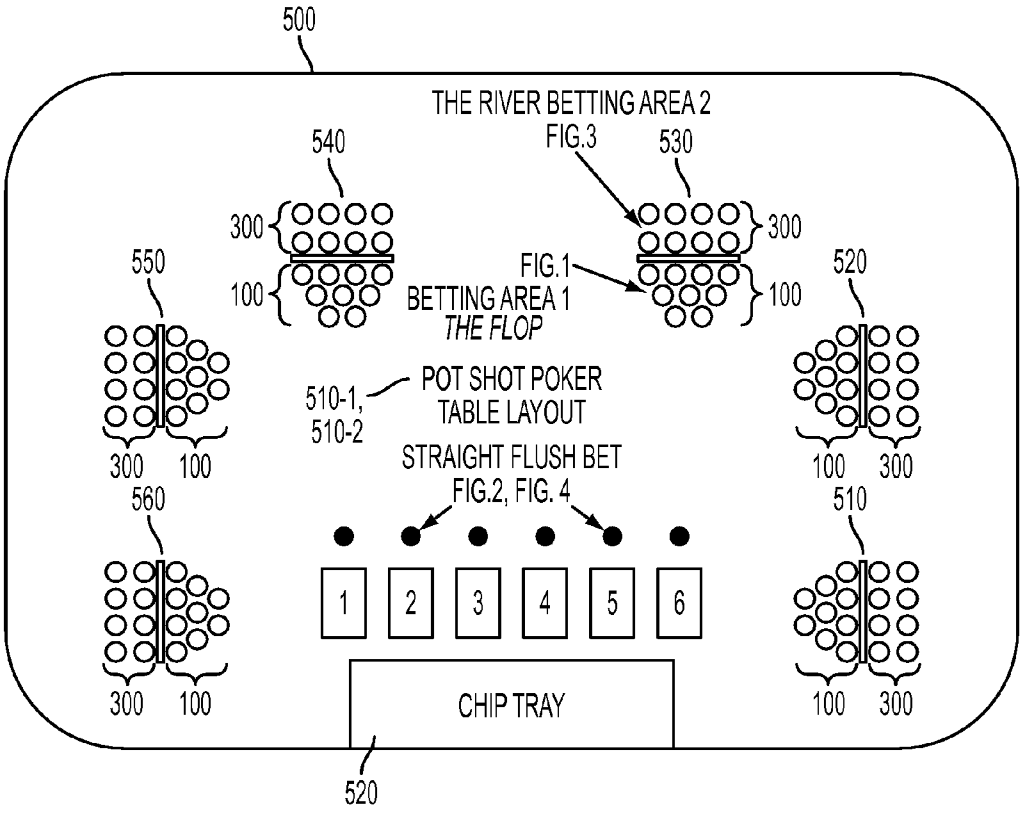
FIG. 5 shows a six player table arrangement which is a key to explaining betting areas of FIGS. 1 and 3, the Flop and the River, of a betting section and shows the dealer's position for dealing, for example, at least one River card first, i.e., a sixth card, and a chip tray.

Of course, with respect to FIGS. 1 and 5 and typical table play, wagers may typically be made by chips in denominations of $0.25, $0.50, Dollars, five, tens and the like in known manner; also, if chips are not available, coins such as quarter and half dollars may be allowed to wager. Referring to FIG. 5 again, briefly, the dealer maintains a chip tray 520 from which, in known manner, a player at the table 500 of FIG. 5 may provide chips to players for purchase and for paying winning bets in Pot Shot Poker.

FIGS. 2A-2B and FIG. 4 merely show exemplary payoffs, returns and the like for the various Pot Shot Poker wager options. FIG. 2A provides an exemplary table showing a Hand 210 such as Royal Flush, a possible Payoff 220 such as $1000 for each dollar wager on a Royal Flush wager, a Probability 225, for example, of 0.000028 for receiving a Royal Flush and a Return 230 of 0.027777. A dealer or the house may very well not wish to offer a Royal Flush option because of the high pay-off that the dealer would be pressed to make. So a dealer should be able to choose not to offer some or all of Pot Shot Poker betting options to other players. On the other hand, the dealer may very well choose to provide a NO PAIR 110, 310, 610 opportunity at little risk to his choice of game and potential loss of revenue. FIG. 2B shows an exemplary conversion table among the various Pot Shot Poker wager positions providing True odds 240, pay offs 220 and RTP (return to player) 230 for each wager position of a set of wager positions No Pair through Royal Flush. For example, No Pair may have True Odds 240 of 1.82719821 but a pay off 220 set by the house of 1.5 and so an RTP or return to player of 0.820929. FIG. 4 is another table showing possible hands and pay offs in dollars for the given hands and respective probabilities and the like. In an alternative embodiment of FIG. 1, a pay off may be displayed in each position of The Flop 100.

Figure 3:
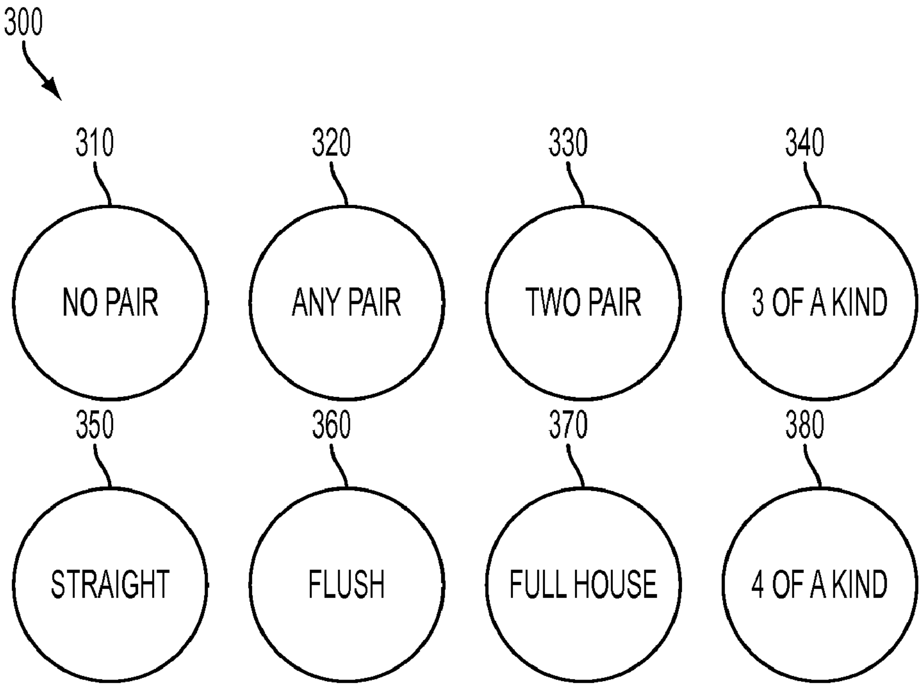
FIG. 3 provides a further exemplary table position referred to herein as The River having eight betting areas; in one embodiment of Pot Shot Poker, the River betting area receives wagers for a sixth card for combination with five dealt cards to determine a potentially improved hand. Table of exemplary hands and pay-offs, from Nothing to a Royal Flush.

FIG. 3 provides an example of a second wager that may be placed by a player after an initial plurality of cards, such as five, have been dealt. For example, the first plurality of cards may be five cards. The player may place a bet on a sixth card shown in FIG. 5 dealt by the dealer. This secondary betting area may be referred to herein as The River 300 shown in FIGS. 3 and 5. Eight exemplary positions of The River 300 are shown in FIG. 3 comprising, by way of example, No Pair 310, Any Pair 320, Two Pair 330, 3 of a Kind 340, Straight 350, Flush 360, Full House 370 and 4 of a Kind 380. In the six card example discussed below, one extra card, a sixth card, is shown in FIG. 5. The table of FIG. 5 may be easily adaptable for the play of a poker game with a seventh card such as seven card stud.

Now one embodiment of a Pot Shot Poker auxiliary table game will be described with reference to a flowchart of game play per FIG. 7 with reference also to The Flop 100 of FIG. 1, The River 300 of FIG. 3 and the exemplary table for a six card poker game per FIG. 5. In this embodiment the player places wagers on the outcome of a poker hand dealt by the dealer.

At 710 of an exemplary Pot Shot Poker auxiliary table game, a dealer or automated shuffler shuffles a standard deck of cards in a known manner prior to dealing a hand. A player sitting at a position 510, proceeding counter-clockwise around the table, 520, 530, 540, 550, 560 at a Pot Shot Poker table of FIG. 5 has two betting areas in front of the player, The Flop 100 and The River 300, per FIGS. 1 and 3 respectively. A player may bet on the hand dealt by the dealer as seen in FIG. 5 as card positions 1-6, where the first five cards may be dealt first.

At 720, a player may place one or more wagers in betting area 100, The Flop, prior to a deal of the first, for example, five cards by the dealer. If so inclined, a player may also wager on a straight flush in position 510-1 of FIG. 5 which may be closer to the dealer for control purposes. At 730, and referring to FIG. 5, there may be a left-hand side, first five card positions in front of a dealer and a sixth card position at the right. The dealer may deal out five cards in the first five positions to himself which may be referred to as The Flop as seen as the first five card positions in front of the dealer.

With the first five cards dealt by the dealer and for wagers placed in Pot Shot Poker on that hand, it becomes clear whose Flop wagers on the first five cards are winners and whose are losers. At 740, let us assume that the first five cards dealt to the dealer show no pair. Then, all wagers in The Flop 100 bet on the first five cards that are not No Pair are losers and are collected. All wagers on the first five cards (the Flop) on No Pair 110 are winners and so are paid a pay off consistent with, for example, a no pair probability after five cards. If the unlikely event of a straight flush bet is placed at 510-1 and a straight flush is dealt in five cards by the dealer in this embodiment, then, the dealer checks the straight flush bet area and pays a winner a very large pay off. As the wagers are independent of each other, should a winning combination be higher than a player's original wager, only the highest ranking hand will be paid. As an example should the player have a wager on a pair of Jacks—Aces position and there are 3 Queens dealt on the board, only the wagers for the Pot Shot Poker position, 3 of a Kind, will be paid.

Referring now to FIG. 6, there is shown an exemplary area which may be a display area of Video Poker apparatus comprising a touch screen whereby inputs may be made by touching screen positions of a video poker machine or apparatus for playing an embodiment of Pot Shot Poker resembling five card draw poker. There may be provided a plurality of betting positions selectable and actuable for accepting a wager in credits and having an indicated pay-off. The Pot Shot Poker positions may comprise, for example: No Pair 610 (paying 2 to 1), Pair of 2 deuces through 10's 612, Pair of jacks through aces 614 (paying 4.5 to 1) and having a two credit minimum, 2 Pair 620 (7.5 to 1), 3 of a Kind 625 (13 to 1), Straight 630 (80 to 1), Flush 632 (80 to 1), Full House 635 (80 to 1), 4 of a Kind 640 (400 to 1), Straight Flush 645 (8750 to 1) and Royal Flush 650 (30,000 to 1). If a player wants to erase a Pot Shot Poker wager before a game begins and get their money back they may use clear pot shot wagers button 655. Once all bets are placed prior to a deal (or partial deal in an alternative embodiment), the player may signal the same using Deal Draw 785 key/button/position on a touch screen. Change/Service 665 may be used, for example, to signal for services or to request change for a high denomination bill or chip. Credit button 1 Credit 170 may be used for selecting a credit value for a wager or for inputting credits to each associated wager selection. Hold buttons 675-1 through 675-5 are used to actuate a selection of cards to hold, all others being discarded. The hold buttons are associated with particular displays of a five card hand dealt. For example, the card positions 1 to 5 may represent A (D), 10 (H), Q (S), 8 (S), 10 (S). A player may choose to hold the pair of 10's and/or include the Ace of Diamonds or hold the three spades hoping for a flush by actuating appropriate hold button. The hold button may have equivalently read Discard signaling which cards to discard. Max Bet position 680 may be made to maximize a video poker wager on a particular selection.

Also, additional unique features are, for example, that all Pot Shot Poker wagers are separate from each other. Players must bet specific outcomes 610, 615, 620, 625, and so on to win after placing a wager and before actuating Deal Draw 685. The Pot Shot Poker Game may be used as a supplement to other standard or variations of video poker; (however, pay tables would need to be adjusted for proper house hold if, for example, wild cards are used.) The pay-offs shown in FIG. 6 are exemplary only and will vary depending on a selected card game or available video poker game. The odds display may be automatically adjusted as may be further explained via electronic odds and pay-out calculation apparatus that will be discussed in connection with FIG. 8 via a data processor 800.

Wagers are placed by the added spaces on the button panel of FIG. 6 or the positions added to a poker table surface per FIGS. 1, 3, 5 and/or other known technology such as having wagering spaces on LCD or other display screens or touch screens of a portable apparatus such as an I-Pad. Button or position wagering can vary in number of bets/wagers depending on different pay table variations that may be automatically calculated.

Higher paying outcomes such as the royal flush 650 of video poker FIG. 6 or poker card game surface FIG. 5, straight flush 510-1, 510-2 is achieved by the ability of a player to place a small bet that can turn into a unique bigger payoff not available from standard video poker. It is also believed that a No pair wager option 110, 310 610 is a first of its kind in the play of a poker game. The games wagering options of Pot Shot Poker provide a wider variety of playing that could be appealing in different ways to a wide range of people. The Pot Shot Poker auxiliary draw poker game per FIG. 6 can also be played as a table poker card game with a different format but on a table similar to that shown in FIG. 5.

A table poker game having an auxiliary Pot Shot Poker game may vary quickly from dealer to dealer, for example, from five card stud to seven card stud to five card draw and so on round a table. Consequently, it may be advantageous to provide automatic odds and pay-off data to a dealer as the dealer inputs a selected game to the apparatus, for example, per FIG. 8 as will be further described herein.

Given all of this information and the opportunity that a player now has the unique opportunity for a large jackpot payoff, Pot Shot Poker is a game that separates itself from the current variations known of associated standard games of poker. Pot Shot Poker is also an auxiliary game that is believed to be highly marketable to the House and to players.

Figure 7:
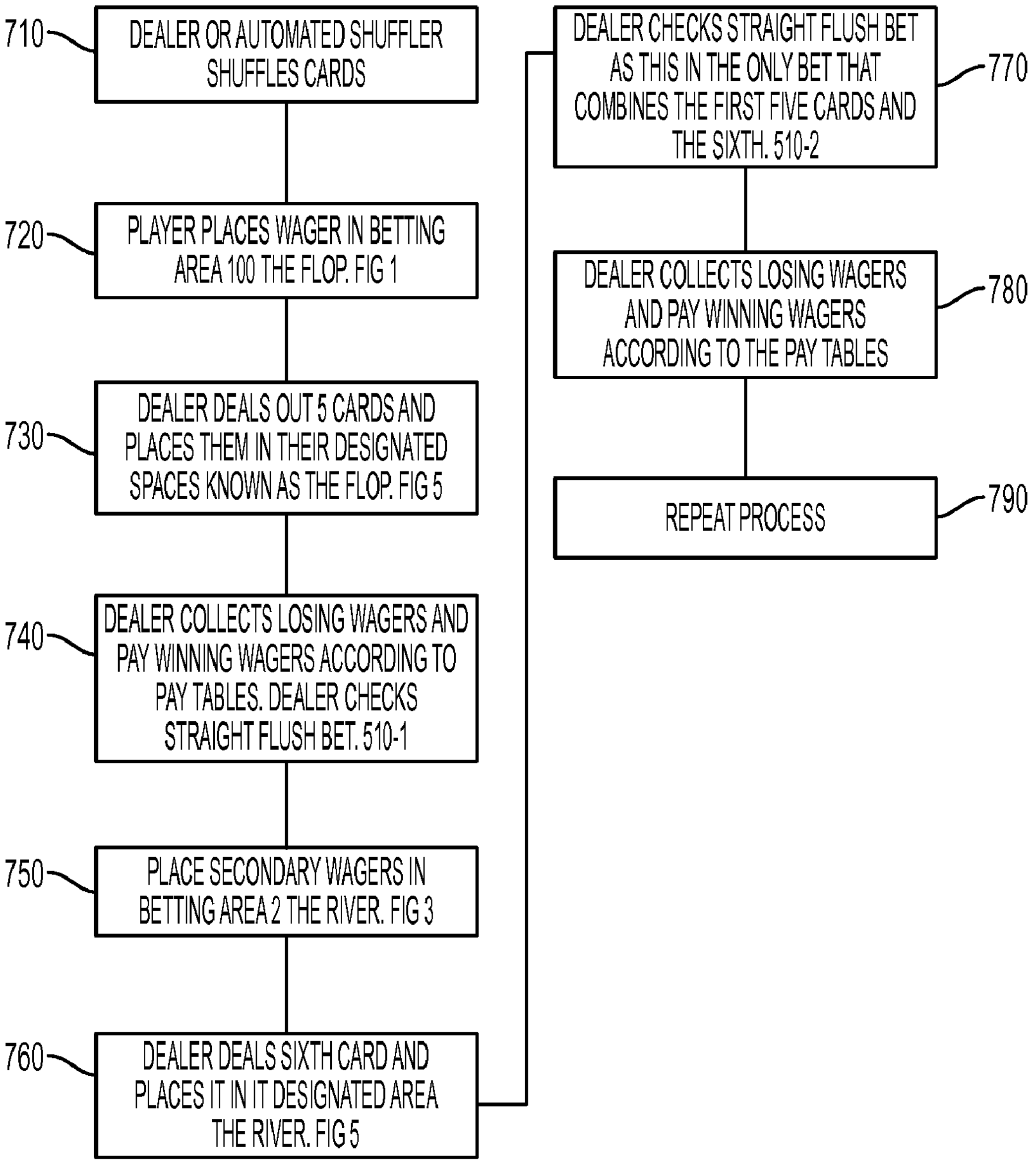
FIG. 7 is an exemplary flowchart of a method for playing a Pot Shot Poker auxiliary table game with reference to FIGS. 1's 3 and 5.
Figure 8:
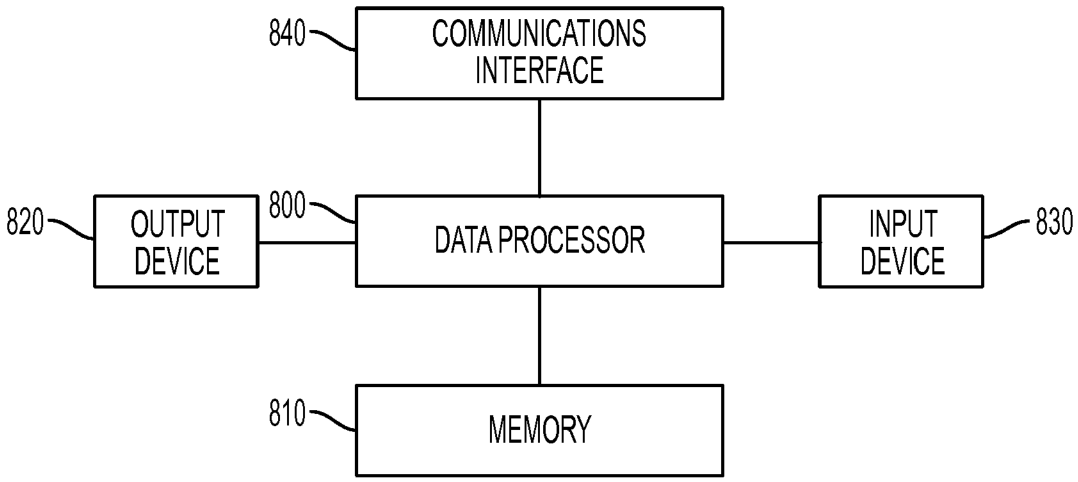
FIG. 8 is an example block schematic drawing of a video poker gaming apparatus or system specially programmed to play standard poker and the Pot Shot Poker auxiliary game.

FIG. 8 is an exemplary block schematic diagram of a Pot Shot Poker apparatus or system for permitting play of Pot Shot Poker, providing odds calculations, if necessary, accepting inputs such as wagers and the like and outputting displays of a video poker game and Pot Shot Poker, making pay-offs and providing other outputs. Element 800 may be a data processor well known in the art or a programmed array specially programmed in accordance with known video poker games and/or further providing a Pot Shot Poker auxiliary game adapted for play with the video poker standard game. The system may be implemented in any form such as a personal computer, personal data assistant, intelligent wireless mobile telephone, tablet computer or other device programmed for video poker and Pot Shot Poker. Processor 800 is coupled to memory 810 for storing a computer implemented method of operation of the auxiliary Pot Shot Poker game per FIGS. 1-7 and 9. Memory 810 may contain, for example, short term memory of wagers made, cards dealt, games selected and the like and long term memory for computer programs, downloads of same and the like. Memory 810 may also receive and store calculated pay-offs received from processor 800 or via a query via communications interface 840. Communications interface 840 may be equipped with GPS and/or with automatic number identification. The calculated pay-offs offered, won and the like may be output via a display 820 of output 820. Output 820 may be utilized in video poker and Pot Shot Poker to make pay-outs to players via a selected manner of receipt as described above into the player's several accounts, if permitted. Input device 830 may be a display for accepting Pot Shot Poker commands, a touch screen or keys or positions per FIG. 1 or 2 or may receive cash or credits or other inputs such as clear Pot Shot wager 655 or Deal Draw 685 to trigger card release. Input device 830 or output device 820 may likewise represent a denomination indicator 660-1 or 660-2.

Now, an example of play of the video poker auxiliary game of FIG. 6 will be discussed with reference to FIG. 9. At 905 of FIG. 9, a player of an auxiliary game of FIG. 6 to a video poker gaming apparatus of FIG. 8 selects a video poker machine (which may be a mobile device) which is approved in that jurisdiction. The player inserts currency or, otherwise, enters an amount of money to play with. It is anticipated that some states may permit or Native American casinos may permit electronic funds transfer (EFT), use of credit cards, debit cards and the like to play, purchase a number of credits and select a denomination of credit value for play at 910. Only those jurisdictions that allow such transactions will allow that function to be operational on the video poker device. At 915, a player may choose between one or another set of wagers or select both sets of wagers: standard video poker and Pot Shot Poker. At 920, a player will select 1-max credits to wager on the standard video poker game by actuating either the one credit button 670 or the max credit button 680 of FIG. 6. Standard video poker, other than Pot Shot Poker, bets are not shown in FIG. 6.

At 930, the player may also or alternatively select Pot Shot Poker's wagers via positions/buttons/touch screen display keys 610, 612, 614, 620, 625, 630, 632, 635, 640, 650 shown or other keys at the discretion of the computer programmer or machine manufacturer for Pot Shot Poker. The player may press the button once for each 1 credit wager up to a maximum wager that may be set by the computer programmer or machine manufacturer. At 935, upon completion by a player of selection and actuation of a plurality of choices and wager values in credits, the player than presses a deal/draw button 685. At 940, just as in a video poker standard game, a machine or mobile device may then randomly select five cards and display them on a display screen. Optionally, a standard or Pot Shot Poker pay off may be made after five cards, for example, in a five card stud game. At 945, and in conjunction with a five card draw video poker game, the player selects which cards to hold by actuating hold buttons 675-1 through 675-5 which each correspond to one displayed card. Optionally, wild cards may be selected or provided such as jokers in a video poker game, not shown. Once a selection of what to keep and what to discard is made, at 950, a player actuates the deal/draw button 685 again to complete their hand. The discards disappear from a screen and random cards appear from a virtual deck in their place at 955. Now, a five card draw poker hand is complete. At 960, the five cards now on the screen may determine whether or not there is a match with the Pot Shot Poker wagers 610-650. If there is a match, then, the player receives the number of credits appropriate for the number of credits wagered on the winning position and in accordance with the displayed pay off for that position. At 970, if the player has not selected the final hand outcome correctly, those wagers at losing positions 610-650 are lost.

Figure 9:
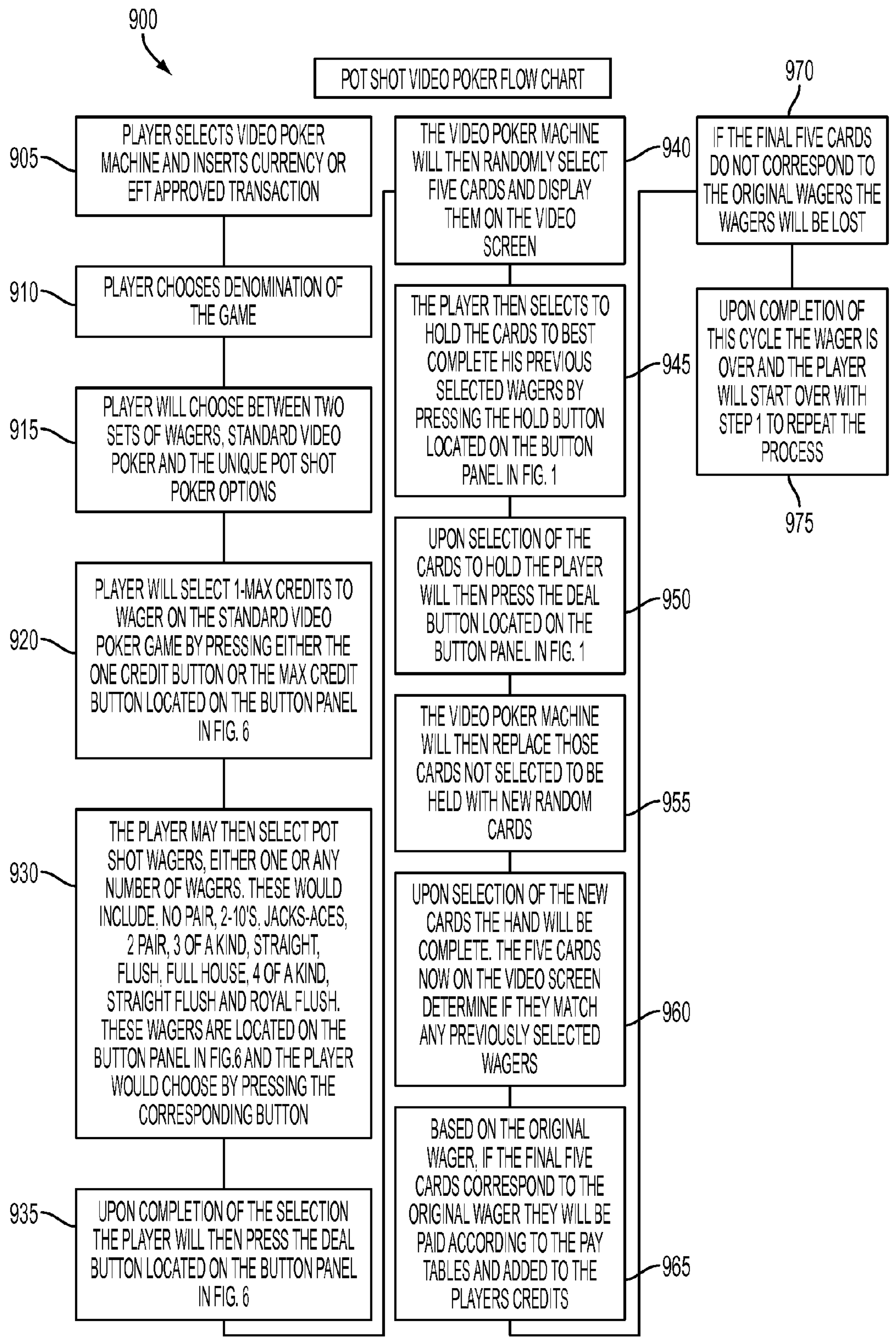
FIG. 9 is a flowchart for a Pot Shot Poker auxiliary game to a video poker game played on the apparatus or system of FIG. 8 and having the exemplary panel of FIG. 6.

FIGS. 7 and 9 are exemplary flowcharts of a method for playing Pot Shot Poker either embodied as video poker or supplementing a dealer of a poker card game. Generally speaking, a standard poker game may be selected from any number of existent games of poker or provided-for games at a video poker apparatus or for table play. Odds/pay-offs for Pot Shot Poker may be displayed or described by a dealer for a selected standard poker game. Cards are dealt, and, for example, once all cards are dealt and the game outcome determined, a payout may be made. Now a further exemplary embodiment will be described for five card stud.

Alternative Five Card Stud

A first card of a five card stud hand may be dealt in an alternative five card stud game. Data processor 800 or a dealer or a player may now know what first card has been dealt and, in apparatus, stored in memory 810. Data processor 800 can cause display 820 to output a new payoff as appropriate via, if necessary, a query via communications interface 840 or may be calculated at processor 800 given the card dealt. One card having been dealt, there is one less card in the deck and so, for example, the pay-outs for some options may change depending on the card. Consequently, a recalculation of pay-outs as outcomes becomes more/less likely with each card dealt in this alternative game. For example, after two straight diamonds going for a diamond flush, a player may see the pay-outs change for flush 632 if the player wishes to place another bet/wager after betting No Pair 610 before the game began.

Now, if the next card dealt is a club, the flush bet may be collected by the house or dealer. If the hand is still described by No Pair, then, a No Pair bet is still active. Finally, after five cards, and if the hand is a jack high hand, the player may lose the poker game but still win a No Pair value of credits from a one credit bet based on the calculated pay-off.

Other poker games may be adapted to permit play of Pot Shot Poker by one of ordinary skill in the art. A Pot Shot Poker lottery game may be provided by jurisdictions as an instant win game supplemental to a standard poker game with predetermined odds for both the standard game and the Pot Shot Poker game where a scratch-off position on a lottery ticket is a Pot Shot Poker auxiliary game position with a predetermined pay off. This would be done as long as there would be no conflict with state lottery laws and regulations. Thus, there has been described the play of an auxiliary game that may be adapted for play with standard video poker and poker card table games with, for example, auxiliary pay-off calculation apparatus or without such apparatus if the poker game selected remains constant. The scopes of the several embodiments discussed above should be deemed only limited by the scope of the claims which follow.

What I claim is:

1. Auxiliary game apparatus to a poker game for implementation as an adjunct auxiliary game to a video poker apparatus offering a video poker game comprising a data processor for calculating a predetermined pay-off dependent on receiving a player's selection of the player's predicted final poker game hand or partial hand outcome and an associated wager of the auxiliary game prior to display of the player's final poker hand of the video poker game, the predetermined payoff varying with the player's selection of the player's selection of the player's predicted final poker hand or partial hand outcome and the associated wager;

an input device comprising a means for receiving the players specific prediction of the player's final poker hand outcome or partial hand outcome comprising one of no pair, one pair, two pairs and three of a kind and the player's associated bet on the player's specific prediction of the player's final poker game hand or partial poker game outcome prior to displaying a remaining card of the player's final poker game hand or partial game outcome;

an output means for displaying or outputting a calculated pay-off dependent on the player's selection of a poker game for play and on the dealt or displayed player's final poker game outcome or partial game outcome to the player, a stage of game play and a waged-upon specific player predicted final poker hand outcome, the player's final poker hand being compared with the player's specific prediction of the player's final poker hand outcome or partial hand outcome to determine the pay-off responsive to the associated bet; and a memory for storing data representing the player's specific prediction of the player's final poker hand outcome or partial hand outcome and for storing the cards displayed of the player's specific final poker game outcome or partial game outcome for comparison with the stored player's prediction of the player's final poker game outcome or partial game outcome and the player's bet associated with the player's selection of the player's specific predicted final poker game hand or partial hand outcome.

2. The auxiliary game of claim 1 further comprising a communications interface whereby the data processor may query for a calculated pay-off and receive a response related to the calculated pay-off.

3. The auxiliary game of claim 1 further comprising a means for receiving the player's specific prediction of the player's final poker game hand outcome, the player's specific prediction of the player's final poker hand outcome further comprising a straight flush.

4. The auxiliary game of claim 1 further comprising a means for receiving the player's specific prediction of the player's final poker hand outcome, the player's specific prediction of the player's final poker hand outcome further comprising a flush.

5. The auxiliary game of claim 1 further comprising a means for receiving the player's specific prediction of the player's final poker hand outcome, the player's specific prediction of the player's final poker hand outcome further comprising a straight.

6. The auxiliary game of claim 1 further comprising a means for receiving the player's specific prediction of a final poker hand outcome, the player's specific prediction of the player's final poker hand outcome further comprising a full house.

7. The auxiliary game of claim 1 further comprising a means for receiving the player's specific prediction of the player's final poker hand outcome comprising no pair.

8. A surface of a poker table for playing a poker card game comprising an auxiliary game position comprising a player position for displaying a player's prediction of the player's specific predicted final poker hand outcome comprising one of no pair, one pair, two pairs and three of a kind and, each displayed player's specific predicted final poker hand outcome of the player position adapted to receive an associated bet by the player prior to dealing the player's final poker hand outcome and play of a stage of the poker card game, the player's associated bet being received at a player selected position prior to poker card game play, the associated bet being on the player's specific prediction of the player's final poker hand outcome, whereby the player of the auxiliary game receives a predetermined pay-out if the player position received the associated bet prior to poker card game play and the player position receiving the bet on the player's prediction of the player's specific predicted final poker hand outcome matches the player's final poker hand outcome dealt to the player of the poker card game, the predetermined pay-out varying with the player's selected position of the player's final poker game hand and received associated bet.

9. The poker table surface of claim 8 further comprising a position for displaying the player's specific predicted poker hand outcome, the player's specific prediction of the player's final poker hand outcome further comprising a straight flush.

10. The poker table surface of claim 8 further comprising a position for displaying the player's specific predicted poker outcome, the player's specific prediction of the player's final poker hand outcome further comprising a flush.

11. The poker table surface of claim 8 further comprising a position for displaying the player's specific predicted poker hand outcome, the player's specific prediction of the player's final poker outcome further comprising a straight.

12. The poker table surface of claim 8 further comprising a position for displaying the player's specific predicted poker hand outcome, the player's specific prediction of the player's final poker hand outcome further comprising a full house.

13. The poker table surface of claim 8 further comprising a position for displaying the player's specific predicted poker hand outcome comprising no pair.

14. The poker table surface of claim 8 further comprising a plurality of betting positions for player's specific predicted poker hand outcome after a deal of six or more cards to the player.

15. Video poker apparatus comprising a data processor for a computer-implemented method of outputting a pay-off for an auxiliary poker game to a poker card game and having an input device adapted to receive a value of a player's wager on the player's prediction of the player's specific, predicted final poker game hand outcome of one of a no pair, one pair, two pair, three of a kind, a straight flush, a full house, a straight flush and a royal straight flush as a selected player's wager before cards of the player's final five card poker game outcome are displayed on a display of the apparatus, the data processor actuating a predetermined payout via an associated output device, the payout being calculated responsive to the received value of the player's wager, responsive to comparing the player's prediction of the player's specific predicted final poker game hand outcome and the final displayed five card poker game outcome of the player of the poker card game, and responsive to a predetermined payoff return determined according to the player's selection of one of no pair, one pair, two pair, three of a kind, straight, flush, full house, straight flush and royal straight flush prediction of the player's specific predicted final poker game hand outcome, the predetermined payout varying with the player's selection of the player's final poker game hand and the value of the player's wager.

16. The video poker apparatus of claim 15 wherein the video poker apparatus provides input means to the data processor for receiving the player's selection of one of a plurality of five possible video poker cards to hold or to discard, the display adapted to show a five card poker hand to a player before the final poker game hand is displayed and the apparatus comprising an input device comprising a hold or discard input for the five displayed cards of the five card poker hand.

17. The video poker apparatus of claim 15 further comprising a communications interface for communicating a query to the data processor for a predetermined payout and receiving a response via the interface.

18. The video poker apparatus of claim 15 comprising a mobile device in communication with a remote server, the mobile device having a geographical positioning system for determining a jurisdiction in which the mobile device is located and precluding play in the determined jurisdiction if the jurisdiction does not permit play of the game.

19. The video poker apparatus of claim 15 comprising automatic number identification for determining a telephone number for a communications interface for connecting to the video poker apparatus, the automatic number identification being input to the data processor of the video poker apparatus for determining whether game play may proceed responsive to the data processor determining a geographic location for the telephone number.

20. The video poker apparatus of claim 16 wherein a deal/draw key provides a means for inputting a request for cards upon placement of wagers on one of the no pair, one pair, two pair, three of a kind, straight, flush, full house, straight flush or royal straight flush specific predicted final poker hand game outcome and a request for cards after input is received for a selection of cards to hold or discard.

* * * * *